United States Patent Office 3,095,403
Patented June 25, 1963

3,095,403
PROCESS FOR THE PRODUCTION OF POLYETHYLENE TEREPHTHALATE
Erhard Siggel, Laudenbach (Main), and Lothar Riehl, Obernburg (Main), Germany, assignors to Vereinigte Glanzstoff-Fabriken AG, Wuppertal-Elberfeld, Germany
No Drawing. Filed Apr. 29, 1959, Ser. No. 809,621
Claims priority, application Germany June 13, 1958
2 Claims. (Cl. 260—75)

The present invention relates to an improved process for the production of high molecular weight polyethylene terephthalate.

It is a well known fact that polyethylene terephthalate is prepared by a two-stage process. Initially, dimethyl terephthalate or terephthalic acid is reacted with ethylene glycol to form the diglycol ester of terephthalic acid by means of an ester interchange. A certain amount of a low molecular weight precondensate is also formed at this time. Thereupon, the temperature of the reaction is raised and a vacuum is applied to the system to produce a polycondensate by splitting off methanol or water. Both the ester interchange reaction and the polycondensation require the use of particular catalysts if the processes are to be completed within a reasonable period of time. The most frequently used catalysts for the ester interchanges are magnesium acetate, zinc acetate, manganese acetate, and lead oxide. The catalysts that are commonly employed for the polycondensation stage of the reaction are antimony trioxide, lead oxide, and boron trioxide.

There are several problems involved in the production of polyethylene terephthalate that are created because of the need for separate ester interchange and polycondensation catalysts. Because it is desirable to avoid interrupting the course of the reaction after the ester interchange, the polycondensation catalysts are often added to the dimethyl terephthalate and ethylene glycol charge. Adding the catalysts at the same time, however, creates several difficulties. First of all, during the ester interchange certain compounds such as methanol, glycol, and certain aldehydes are present which considerably reduce the effectiveness of or inactivate the polycondensation catalyst. Secondly, the fact that the polycondensation catalyst is exposed to high reaction temperatures (160–240° C.) for four hours or more also impairs its efficiency. Thirdly, during this four hour or more period, the catalysts are reduced freeing their metal ions which decrease the quality of the end products, for example, by causing the polycondensate to take on a greyish color.

In order to avoid the disadvantages described above, processes have been developed in which the polycondensation catalyst is added after the ester interchange. Because the two reactions are not entirely separate, however, the reaction vessel contains both a mixture of diglycol terephthalate and low molecular weight polyethylene terephthalate which have different viscosities. Therefore, powdered catalysts such as $Sb_2O_3$ would not be adequately distributed in the precondensate because of its greater viscosity. This is especially true where the process is being carried out under plant scale conditions. If the catalyst is added in the form of tablets after the ester interchange, the tablets tend to sink to the bottom of the precondensate and cannot be uniformly distributed throughout the reaction mixture even with vigorous stirring.

As was indicated above, a vacuum is usually applied to the system after the ester interchange in order to complete the polycondensation of the glycol and terephthalate acid or ester. When a catalyst in powder form is added after the vacuum is placed on the system, it tends to be drawn off or be blown away before it reaches the surface of the precondensate.

Attempts to suspend the catalysts in materials such as glycol have not proven sucessful because the added compounds often cause a decomposition of the polymer chain which substantially lengthens the time needed to complete the condensation.

It is an object of the present invention to provide a process for preparing high molecular weight polyethylene terephthalate which is not subject to the difficulties discussed above in connection with the prior art.

Another object of the invention is to provide a process for preparing polyethylene terephthalate which can be completed in as short a time as about four hours.

A further object of the invention is to provide a method of preparing polyethylene terephthalate wherein the color of the finished product is greatly improved over that obtained following prior art processes.

Still another object of the invention is to provide a process for the production of an improved catalyst for the preparation of polyethylene terephthalate.

In general, the present invention involves the discovery that the known methods of preparing polyethylene terephthalate polymers can be improved by mixing the polycondensation catalyst with a small amount of precondensate and thereafter adding this mixture to the reactants at about the time that the ester interchange has been completed or shortly thereafter.

It has been found that the polycondensation catalyst can be added to the precondensate without difficulties if that catalyst is first mixed with a small amount of the precondensate. In order to obtain as rapid a homogenization as possible, the catalyst-precondensate mixture should have approximately the same viscosity as the precondensate at the time that the addition is made. This can be accomplished in one of several ways. The catalyst can be distributed in molten precondensate and after the mixture is solidified it can be used in the form of fragments. The solidified catalyst-precondensate mixture can also be pulverized and then pressed into tablets. Another method of combining the catalyst and precondensate is to mix powdered catalyst with solidified and ground up precondensate and then press the mixture into the form of tablets.

The amount of polycondensation catalyst added to the charge should be from about 0.01% to about 0.04% by weight based on the weight of the dimethyl terephthalate supplied to the charge. The ratio of catalyst to precondensate used in the catalyst mixture preferably is from about 1:1 to about 1:10.

As was pointed out above, the precondensate charge and the precondensate-catalyst mixture preferably have similar viscosities. This viscosity should be from about of $\eta_{rel}=1.08$ to 1.2 when the mixture is added to the charge. This corresponds to a K value of about 17 to 25 (determined as a 1% solution in m-cresol at 25° C.). The catalyst-precondensate mixture can be added to the charge at the beginning of the polycondensation process. The addition should take place, however, when the system is under a vacuum of less than 15 mm. mercury.

The first two examples given below are illustrative of a method of preparing the polycondensation catalyst. The parts specified in the examples are parts by weight.

*Example 1*

Seven hundred and twenty (720) g. of DMT (dimethyl terephthalate), 600 ml. of ethylene glycol, and 108 mg. (0.015%) of zinc acetate were melted in a flask with stirring under a nitrogen atmosphere. The temperature of the reactants was raised as quickly as possible, but care was taken to insure that no ester was distilled over with the split off methanol and ethylene glycol. After reaching a temperature of 240° C. (3½ hours) the pressure within the flask was carefully brought down to 0.1 mm. mercury during the 45 minute period while the temperature of the reactants was gradually increased to 270° C. After 45 minutes nitrogen was added to release the pressure. Thereupon, 640 g. of antimony trioxide powder was stirred into the hot fusion under a blanket of nitrogen. After the mass had been allowed to cool it was broken up into fragments or was presesd into tablets to be used as a polycondensation catalyst.

*Example 2*

The process described in Example 1 was carried out again except that the antimony trioxide powder was not added to the precondensate until after it had been cooled under a nitrogen atmosphere for one hour and then finely pulverized in a mill. At this point the catalyst was mixed with the precondensate powder in a 1:1 ratio. The mixed material was then pressed into the form of pills or tablets.

*Example 3*

This example illustrates the results that are obtained by following prior art procedures in the production of polyethylene terephthalate.

Five hundred (500) g. of DMT (dimethyl terephthalate) was melted under a nitrogen blanket with 345 ml. ethylene glycol, 75 mg. of zinc acetate (0.015%) and 100 mg. antimony trioxide (0.02%). After a suitable mixture had been obtained with stirring, the temperature of the reactants was raised rapidly enough to insure that no ester passed over with the separated distillate. After reaching a temperature of 240° C. (3½ hours) 250 mg. titanium dioxide (0.5%) was added to the reactants in the form of a 20% ethylene glycol dispersion. The pressure within the flask was then carefully reduced to 0.1 mm. Hg over a 45 minute period. At this point the temperature of the reactants had reached 270° C. While maintaining the vacuum of 0.1 mm. Hg, the reaction temperature was gradually raised to and maintained at 276° C. until the product reached a viscosity of $\eta_{rel}$ 1.635.

Data:
  Total condensation time_____5 to 5½ hours.
  Solution viscosity_____$\eta_{rel}$=1.630 to 1.640.
  Softening point_____260 to 261° C.
  Remission degree at 460 m$\mu$___70 to 72% with material that was matted with 0.5% titanium dioxide.

The color of the product in terms of remission measurements was determined by the use of an electric remission photometer having a filter of 460 m$\mu$. The percentages given in the data indicate the amount of light reflected from the product and are based upon a scale in which the reflection of pure MgO is considered as 100%. The measurements were carried out on polymers having a particle size of 0.60 to 0.84 mm. diameter.

*Example 4*

Five hundred (500) g. of DMT (dimethyl terephthalate), 345 mm. ethylene glycol and 75 mg. of zinc stearate were melted with stirring as was described in Example 3. Again, the temperature of the reactants was rapidly raised to prevent any ester from passing over with the separated distillate. After reaching a temperature of 240° C. (3½ hours), a mixture of catalyst and precondensate in the form of pills, tablets or pieces prepared as described in Examples 1 and 2 was added to the reactants along with 250 mg. of titanium dioxide (0.5%) in the form of a 20% ethylene glycol dispersion. The amount of catalyst added corresponded to 100 mg. (0.02%) of antimony trioxide. The pressure in the system was then carefully lowered to 0.1 mm. Hg over a 45 minute period and the condensation was completed as is described in Example 3.

Data:
  Total condensation time from beginning of evacuation_____4½ hours.
  Solution viscosity_____$\eta_{rel}$=1.630 to 1.640.
  Softening point_____260 to 261° C.
  Remission degree_____76 to 78% with material that was matted with 0.5% titanium dioxide.

*Example 5*

In this example the process described in Example 4 was repeated except that the catalyst-precondensate mixture (in the form of tablets) was added at the 1½ hour point in the condensation. At that time the pressure in the system had been reduced to approximately 0.1 mm. Hg. The condensation was then completed as is described in Examples 3 and 4.

Data:
  Total condensation time___4 hours.
  Solution viscosity_____$\eta_{rel}$=1.630 to 1.645.
  Softening point_____260 to 261° C.
  Remission degree_____79 to 80% with material that was matted with 0.5% titanium dioxide.

The present invention improves prior art methods of preparing polyethylene terephthalate in several significant respects. Formerly, the fact that antimony trioxide and other polycondensation catalysts were reduced during the reaction and the fact that nonvolatile aldehyde resins were produced caused the product to be discolored. Following the present teaching, however, any acetaldehyde that forms in the reaction is removed before it can polymerize or condense under the influence of the condensation catalyst. This is especially true where the catalyst is added under a vacuum. Additionally, there is little, if any, discoloration caused by the presence of free metals in the subject method.

Another significant advantage obtained by following the present process is that the viscosity required for the polymer (about $\eta_{rel}$ 1.63) can be reached in approximately four hours rather than in the 5½ hours that is required following prior art procedures. The catalyst is used in its most effective form. No longer is it inactivated due to the action of methanol, aldehydes, etc., or blown out under low pressure conditions. It is now possible to carry out the preparation of polyethlene terephthalate polymers with ease in plant scale operations.

The amount of catalyst used in the present invention corresponds to the amount used in prior art methods. Ordinarily, from about 0.01 to about 0.04% by weight of catalyst based on the amount of dimethyl terephthalate used in the charge is found to be satisfactory. The catalyst preferably is added to the reactants at about the beginning of the polycondensation reaction or shortly thereafter. As was pointed out above, the viscosity of the precondensate charge and the precondensate-catalyst mixture should be approximately equal. Additionally, improved results are obtained if the catalyst is added when the system is under a vacuum of less than 15 mm.

Obviously, many modifications and variations of the invention as hereinbefore set forth may be made without departing from the spirit and scope thereof, and therefore only such limitations should be imposed as are indicated in the appended claims.

We claim:
1. In a method of preparing polyethylene terephthalate wherein dimethyl terephthalate is reacted with ethylene glycol in the presence of an ester interchange catalyst to form a precondensate consisting essentially of the diglycol ester of terephthalic acid and wherein the precondensate subsequently is polymerized in the presence of a polycondensation catalyst, the improvement which comprises: adding the polycondensation catalyst to the reaction sys- tem in the form of a mixture of solidified precondensate having a K value of from about 17 to about 25 and a polycondensation catalyst, the weight ratio of catalyst to precondensate in the catalyst mixture being from about one part catalyst and one part precondensate to about one part catalyst and 10 parts precondensate, the addition of said mixture of precondensate and polycondensation catalyst taking place when the reaction system is under a vacuum of less than 15 mm. mercury and when the reaction mixture has reached a viscosity corresponding to a K value of from about 17 to about 25; and thereafter allowing the polymerization of the precondensate to proceed until polyethylene terephthalate of a desired viscosity has been obtained.

2. In a method of preparing polyethylene terephthalate wherein dimethyl terephthalate is reacted with ethylene glycol in the presence of an ester interchange catalyst to form a precondensate consisting essentially of the diglycol ester of terephthalic acid and wherein the precondensate subsequently is polymerized in the presence of a polycondensation catalyst, the improvement which comprises: adding the polycondensation catalyst to the reaction system in the form of a mixture of solidified precondensate having a K value of from about 17 to about 25 and a polycondensation catalyst, the weight ratio of catalyst to precondensate in the catalyst mixture being from about one part catalyst and one part precondensate to about one part catalyst and 10 parts precondensate, the addition of said mixture of precondensate and polycondensation catalyst taking place when the reaction system is under a vacuum of less than 15 mm. mercury and when the reaction mixture has reached a viscosity corresponding to a K value of from about 17 to about 25; and thereafter allowing the polymerization of the precondensate to proceed until polyethylene terephthalate of a desired viscosity has been obtained, the amount of polycondensation catalyst added to said reaction system being from about 0.01 to about 0.04% by weight based on the weight of the dimethyl terephthalate which is reacted with ethylene glycol.

References Cited in the file of this patent

UNITED STATES PATENTS

| | | |
|---|---|---|
| 2,727,882 | Vodonik | Dec. 20, 1955 |
| 2,828,290 | Caldwell | Mar. 25, 1958 |
| 2,906,737 | York | Sept. 29, 1959 |

FOREIGN PATENTS

| | | |
|---|---|---|
| 610,137 | Great Britain | Oct. 12, 1948 |